United States Patent [19]

Yamada et al.

[11] 3,840,400

[45] Oct. 8, 1974

[54] MAGNETIC RECORDING MEMBER

[75] Inventors: Yasuyuki Yamada; Goro Akashi, both of Shizuoka, Japan

[73] Assignee: Fuji Photo Film Co., Ltd., Kanagawa, Japan

[22] Filed: Apr. 12, 1972

[21] Appl. No.: 243,329

[30] Foreign Application Priority Data

Apr. 15, 1971 Japan ............................... 46-24082

[52] U.S. Cl. .............. 117/235, 252/62.54, 260/836, 260/858

[51] Int. Cl. ............................................ H01f 10/02

[58] Field of Search ............................ 260/836, 858; 117/235–240; 252/62.54

[56] References Cited

UNITED STATES PATENTS

| | | | |
|---|---|---|---|
| 3,247,017 | 4/1966 | Eichler et al. | 117/235 |
| 3,357,855 | 12/1967 | Bisschops et al. | 117/235 |
| 3,366,505 | 1/1968 | Bisschops et al. | 117/235 |
| 3,427,191 | 2/1969 | Howell et al. | 117/235 |
| 3,470,021 | 9/1969 | Hendricx et al. | 117/239 |
| 3,513,021 | 5/1970 | Sweeney et al. | 117/235 |
| 3,597,273 | 8/1971 | Akashi et al. | 117/235 |
| 3,630,771 | 12/1971 | Akashi et al. | 117/235 |

*Primary Examiner*—William D. Martin
*Assistant Examiner*—Bernard Pianalto
*Attorney, Agent, or Firm*—Sughrue, Rothwell, Mion, Zinn and Macpeak

[57] ABSTRACT

A magnetic recording member in which a powder of a ferromagnetic chromium dioxide or a derivative thereof is dispersed in a binder and the dispersion is coated on a support, in which the binder is a composition comprising at least three components, a vinyl chloridevinylidene chloride copolymer an epoxy resin and a polyisocyanate is disclosed.

8 Claims, 1 Drawing Figure

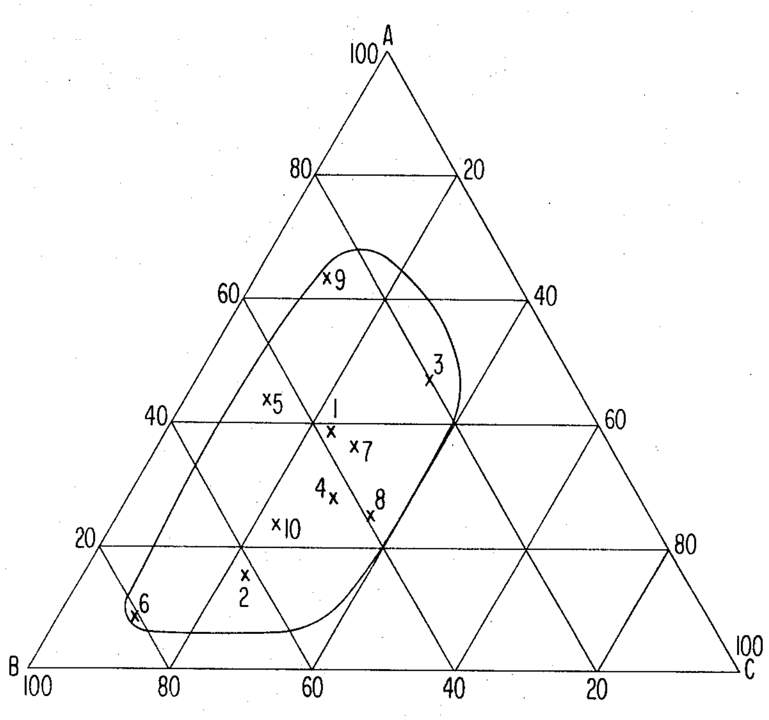
A
100
80
20
60
40
40
60
20
80
B
100
80
60
40
20
100
C
9
3
5
1
7
4
8
10
2
6

MAGNETIC RECORDING MEMBER

BACKGROUND OF THE INVENTION

1. Field of the Invention

This invention relates to a ferromagnetic recording member and more particularly, to a binder for forming a magnetic recording layer (hereinafter termed "magnetic layer") in which a ferromagnetic powder of the chromium dioxide series is dispersed.

2. Description of the Prior Art

Ferromagnetic materials of the chromium dioxide series are used preferably because these materials have the following characteristics: they are needle shaped particles with a good orientation, they have a $B_m$ value more than 20% larger in comparison with ferromagnetic materials of the iron oxide series, a good squareness ratio of the histeresis curve, and a small demagnetization under pressure and they can, by the addition of other metals to the materials, provide a coercive force of greater than 600 oe. However, compared with ferromagnetic materials of the iron oxide series, these chromium dioxide ferromagnetic materials are chemically more active requiring additional care in their handling and, in particular, often ignite in roll mill treatment at a high temperature using cellulose nitrate as binder. In this case, it is very dangerous to use an inflammable organic solvent of high volatility as a solvent for the binder. The materials are so chemically active that there is a report that the materials change gradually in quality at high temperatures and high humidities, i.e., they showed a change of 20 – 30% after 100 hours at 70°C and a relative humidity of 90%.

Hitherto, as binders for forming the magnetic layer of a magnetic recording member, vinyl chloride-vinyl acetate copolymer, polybutyl acrylate, cellulose nitrate, cellulose propionate, cellulose acetate butylate, ethyl cellulose, polyvinyl acetate, styrene-butadiene copolymer, fluorinated vinyl resin, chlorinated polypropylene, polyvinyl butyral, chlorinated polyvinyl chloride, acrylic acid ester copolymer, vinyl acetate-ethylene copolymer, phenol resin, epoxy resin, polyamide resin, melamine-formaldehyde resin, ureaformaldehyde resin, alkyd resin, silicone resin or modified resins thereof have been used either alone or in admixture. However, when these known binder compositions are used together with a ferromagnetic powder of the chromium dioxide series, many problems have occurred, i.e., the dispersion and orientation of the ferromagnetic powder are not good, the magnetic layer formed from the combination of the binder composition and the ferromagnetic powder lacks smoothness and has a poor abrasion resistance in recording and reproduction in contact with a magnetic head.

This invention provides a binder composition which, when a ferromagnetic powder of the chromium dioxide series is used, demonstrates an excellent orientation of the magnetic particles and an excellent smoothness and abrasion resistance of the surface of the magnetic layer.

Further, an object of this invention is to provide a binder composition in which the ferromagnetic material of the chromium dioxide series shows a very small change in quality even at high temperatures and humidities.

SUMMARY OF THE INVENTION

Namely, this invention provides a magnetic recording member in which a powder of ferromagnetic chromium dioxide or a ferromagnetic chromium dioxide derivative (both hereinafter being designated as a ferromagnetic material of the chromium dioxide series) added with a small amount of additives described hereinafter is dispersed in a binder and the dispersion is coated on a support, in which the binder is a composition of at least three components, i.e., a vinyl chloride-vinylidene chloride copolymer, an epoxy resin and a polyisocyanate.

BRIEF DESCRIPTION OF THE ACCOMPANYING DRAWING

The drawing is a triangular diagram which shows the weight ratio of the binder composition used in the magnetic recording member according to this invention, wherein A shows the amount of the vinyl chloride-vinylidene chloride copolymer, B shows the amount of the epoxy resin and C shows the amount of the polyisocyanate.

DESCRIPTION OF THE INVENTION

As the ferromagnetic materials of the chromium dioxide series which can be used in this invention, there are mentioned, in addition to chromium dioxide, modified chromium dioxide materials in which a small amount, i.e., less than about 5% by weight, preferably from about 0.5 to 2% by weight of additives described hereinafter, based to the total weight of the ferromagnetic material is added to the chromium dioxide. These ferromagnetic materials are described detail in the specifications of Japanese Publication Nos. 6087/57, 8626/61, 8839/61, 829/63, 18188/63 and 26652/63. As is obviously seen from these descriptions, components which can be added to the chromium dioxide to provide additional preferred magnetic recording characteristics to the chromium dioxide are ruthenium, tin, antimony, titanium, vanadium, manganese, iron, cobalt, nickel, fluorine, phosphorus, arsenic, bismuth, niobium, tantalum, sodium, potassium, lithium, cesium, cadmium, tellurium, beryllium, boron, magnesium, zinc, zirconium, platinum, gold, mercury and the like. The addition of these components can emphasize the coercive force of chromium dioxide. In general, those ferromagnetic materials having a particle size of from about 0.3 to 1.0$\mu$ are used. The amount of the ferromagnetic chromium dioxide which can be present can vary, however, generally from about 50 to 140 parts by weight, preferably from about 60 to 90 parts by weight, for each 300 parts by weight of the binder composition can be used.

As the support, a high molecular weight film of cellulose diacetate, cellulose triacetate, polyvinyl chloride, vinyl chloride-vinyl acetate copolymer, polycarbonate, polyethyleneterephthalate, polypropylene, polyimide and the like, or a metal such as aluminum, copper and the like can be used.

The binder according to this invention can be characterized as a composition of three components, i.e., a vinyl chloride-vinylidene chloride copolymer, an epoxy resin and a polyisocyanate.

In the copolymer as the first component, the molar ratio of the vinyl chloride to the vinylidene chloride can range from about 95:5 to about 60:40, more preferably from about 90:10 to about 70:30. The degree of polymerization of the copolymer is from about 0.3 to 0.8 based on the intrinsic viscosity. Too large an amount of the vinylidene chloride component decreases the solubility of the copolymer in organic solvents rendering coating impossible, and too small an amount of the vinylidene chloride component provides the disadvantage that the ferromagnetic materials of the chromium dioxide series described in this invention may be unstable and tend to change in quality in a high temperature and a high humidity atmosphere.

As the epoxy resin used as the second component, polycondensates obtained by reacting epichlorohydrin with diphenylpropane in a varying ratios are suitable. The molecular weight of the polycondensate can range from about 300 to 3,000, and the polycondensate has an -OH group in the molecule with the hydroxyl content (the number of OH groups per 100g of resin) thereof being less than 0.5, preferably less than 0.16.

As the polyisocyanates of the third component, there are used 2,4-tolylenediisocyanate and 2,6-tolylenediisocyanate either alone or in admixture, diphenyl-methane-4,4′-diisocyanate, 3,3′-ditolylene-4,4′-diisocyanate and 1,5-naphthalenediisocyanate or their adducts either alone or in admixture having a reactive -NCO group.

It has been found that the weight ratio of the vinyl chloride-vinylidene chloride copolymer, the epoxy resin and the polyisocyanate to be used in the composition of this invention is approximately within the region shown by the closed curve in the drawing. In the drawing, A represents the vinyl chloride-vinylidene chloride copolymer, B represents the epoxy resin and C represents the polyisocyanate. The weight ratio of the vinyl chloride-vinylidene chloride copolymer to the epoxy resin in the composition ranges from about 5:95 to about 80:20 and the amount of the polyisocyanate ranges from about 9 to about 40% by weight of the total weight of the binder components. The closed curve in the drawing shows an approximate weight ratio region. It has been found according to our study that the dispersion of the magnetic powder in the binder in a composition containing a large amount of copolymer is good whereas the abrasion resistance is lowered disadvantageously, that a large amount of epoxy resin improves the adhesion between the formed magnetic layer and the support and improves the abrasion resistance whereas the magnetic layer is weakened, and that a large amount of polyisocyanate improves the solvent resistance whereas the flexibility of the magnetic layer disappears.

The polyisocyanate in the binder composition may probably react with the hydroxyl group in the epoxy resin and the ring-opened moiety of the epoxy group and the ratio of the reactants is not necessarily stoichiometrically 1:1.

In addition to the three components described above up to about 10% of additional materials such as vinyl chloride-vinyl acetate copolymers, polyamide resins, nitrocellulose, polyurethanes, butadiene-acrylonitrile copolymers and acrylate copolymers can be used where desired.

The composition comprising these components may be applied using conventional processing in the manufacture of a "magnetic recording member using ferromagnetic powder" to produce a magnetic recording member and those skilled in the art can select sufficiently the requirements, e.g., the organic solvent for the preparation of coating solution, the coating method and other techniques and equipment necessary for the manufacture of a magnetic recording member.

It will be understood that this invention is very useful in this technical field based on considerably delayed practical applications of ferromagnetic materials of the chromium dioxide series due to the lack of suitable binder compositions although the excellent characteristics of these ferromagnetic materials have been known previously.

This invention will be illustrated in greater detail by the reference to the following examples.

EXAMPLE 1

| | Parts by weight |
|---|---|
| Chromium dioxide powder (mean particle size: 0.6) | 300 |
| Vinyl chloride-vinylidene chloride copolymer (mol ratio: 95:5) | 28 |
| Lecithin | 3 |
| Silicone oil | 0.5 |
| Epoxy resin (Epikote 828, Shell Chemical Co.) | 30 |
| Methyl ethyl ketone-toluene (8:2) | 650 |

The composition of the above components was throughly dispersed in a ball mill, 15 parts of 2, 4-tolylene- diisocyanate were then added to prepare a coating liquid and the coating liquid was coated using a Doctor blade method on a polyethylene terephthalate film (support) coated with polyester resin as an undercoat so that the dried thickness of coating might be 8$\mu$. The coated product was dried, calendered, subjected to the cure treatment of binder components by standing for 12 hrs at 60°C and then cut into a tape to prepare Sample 1.

Similarly, Samples 2 – 10 were prepared using the components and ratios as shown in Table 1 for the copolymer, the epoxy resin and the polyisocyanate.

Table I

| Sample | Vinyl Chloride-Vinylidene Chloride | | Epoxy Resin | | Polyisocyanate | |
|---|---|---|---|---|---|---|
| | Mole Ratio | Parts | Type | Parts | Type | Parts |
| 1 | 95:5 | 28 | 828* | 30 | 2,4-tolylenediisocyanate | 18 |
| 2 | 75:25 | | do. | 46.4 | do. | 18 |
| 3 | 80:20 | 40.6 | do. | 17.4 | Kolonate L** | 28 |
| 4 | 90:10 | 23.2 | do. | 34.8 | do. | 24 |
| 5 | 95:5 | 29 | do. | 29 | Kolonate** HL (do.) | 7 |
| 6 | 75:25 | 5 | 834* | 53 | do. | 7 |

Table 1 – Continued

| Sample | Vinyl Chloride-Vinylidene Chloride | | Epoxy Resin | | Polyisocyanate | |
|---|---|---|---|---|---|---|
| | Mole Ratio | Parts | Type | Parts | Type | Parts |
| 7 | 80:20 | 28 | do. | 30 | 2,4-tolylenediisocyanate | 17 |
| 8 | 90:10 | 23 | do. | 35 | do. | 35 |
| 9 | 80:20 | 40.6 | 815* | 17.4 | Kolonate L** (do.) | 6 |
| 10 | 90:10 | 18 | do. | 40 | do. | 18 |

*Epikote 828,834 and 815, trade names of the Shell Chemical Co.
**Kolonate L and HL, a tradename of the Nippon Polyurethane Co.

Similarly, products coated with a coating liquid of the following composition were prepared.

| | Parts by Weight |
|---|---|
| Chromium dioxide powder Particle size: 0.7μ) | 300 |
| Binder (1) | 28 |
| Binder (2) | 30 |
| Binder (3) | 15 |
| Lecithin | 3 |
| Silicone oil | 0.5 |
| Methyl ethyl ketone/toluene (8:2) | 650 |

Table 2

| Sample | Component 1 | Component 2 | Component 3 |
|---|---|---|---|
| 11 | Vinyl chloride-vinyl acetate copolymer (mol ratio=87:13) | Epoxy resin (Epikote 828) | 2,4-tolylene-diisocyanate |
| 12 | Vinyl acetate resin | Thermoplastic polyurethane resin | Kolonate L |
| 13 | Vinylidene chloride-acrylonitrile copolymer | Thermoplastic polyurethane resin | — |
| 14 | Cellulose acetate butylate | Reactive acrylic resin | Kolonate L |
| 15 | Acrylonitrile-butadiene copolymer (73 pts by wt) | — | — |
| 16 | Vinyl chloride vinyl acetate copolymer | Epoxy resin | Polyamide resin |

The orientation, abrasion resistance and surface smoothness of the magnetic powder and the quality change of the chromium dioxide were tested for the Samples 1 – 10 and Controls 11 – 16 prepared as described above.

The orientation of magnetic powder is shown by the ratio $B_r/B_m$, a larger ratio showing a better orientation. For the abrasion resistance, a sample is placed on a rotary disc to determine the abrasion of the surface, where the abrasion resistance is determined by the time when the background base appears, the larger the time, the greater the abrasion resistance. The surface smoothness is rated by shining a light at an incident angle of 45° to the surface of the tape and determining the amount of reflection.

A sample which has a larger amount of reflection has a better surface smoothness. Since the quality change of the chromium dioxide takes place very slowly at room temperature, it is deteriorated forcedly; i.e., it is held for 20 days at 60°C and 90% RH and the quality change is then rated by the reduction of the $B_r$ value in percent in accordance with the following:

[(original value) — (value after standing for 20 days at 60°C and 90% RH)/(original value)] × 100

The results obtained are shown as follows:

| Sample | $B_r/B_m$ | Abrasion Resistance Time (min) | Surface Smoothness (mv) | Deterioration (%) |
|---|---|---|---|---|
| Invention | | | | |
| 1 | 0.87 | 12 | 420 | 3.2 |
| 2 | 0.85 | 11 | 415 | 4.3 |
| 3 | 0.84 | 8 | 405 | 3.3 |
| 4 | 0.86 | 9 | 420 | 1.2 |
| 5 | 0.85 | 13 | 410 | 5.0 |
| 6 | 0.89 | 11 | 430 | 4.8 |
| 7 | 0.87 | 14 | 425 | 6.1 |
| 8 | 0.84 | 12 | 410 | 2.4 |
| 9 | 0.90 | 13 | 440 | 2.1 |
| 10 | 0.84 | 13 | 415 | 3.0 |
| Controls | | | | |
| 11 | 0.81 | 3 | 380 | 18 |
| 12 | 0.82 | 2 | 390 | 17.5 |
| 13 | 0.81 | 3 | 395 | 10.8 |
| 14 | 0.83 | 4 | 355 | 11.4 |
| 15 | 0.80 | 1 | 385 | 18.3 |
| 16 | 0.83 | 0.5 | 380 | 19.4 |

As can be seen from the results shown above, it is observed that Samples 1 – 10 are very superior in the $B_r/B_m$, abrasion resistance, surface smoothness and quality change to Controls 11 – 16. The mean value of $B_r/B_m$ of Samples 1 – 10 according to this invention is 0.86 whereas the mean value of the known Controls 11 – 16 is 0.82. The abrasion resistance of samples according to this invention ranges from 2 to 20 times that of known compositions. The surface smoothness is determined by reading the intensity of the reflection in mv unit using a photoelectric cell. The mean value of the surface reflection of the samples according to this invention is 419 mv whereas the mean value of the known compositions is 381 mv.

The quality change of the $CrO_2$ of the samples according to this invention is at the most 1/16 and at the least 1/1.8 compared with the known compositions. As mentioned above, the composition according to this invention is excellent over all of the parameters of $B_r/B_m$ value, abrasion resistance, surface smoothness and quality change.

What is claimed is:

1. A magnetic recording member comprising a non-magnetic support having coated thereon a ferromagnetic chromium dioxide dispersed in a binder, said binder comprising a vinyl chloride-vinylidene chloride copolymer, an epoxy resin and a polyisocyanate, wherein the molar ratio of said vinyl chloride to said vinylidene chloride ranges from about 95:5 to about 60:40, and the weight ratio of said copolymer to said epoxy resin ranges from about 5:95 to about 80:20 and wherein the amount of said polyisocyanate ranges from about 9 to about 40% by weight based on the total weight of said binder composition.

2. The magnetic recording of claim 1, wherein the weight ratio of the components of the binder composition are within the area enclosed by the curved line in the ternary phase diagram of the drawing.

3. The magnetic recording member of claim 1, wherein said support is a metal or a high molecular weight polymer film.

4. The magnetic recording member of claim 1, wherein the molar ratio of said vinyl chloride to said vinylidene chloride ranges from about 90:10 to about 70:30.

5. The magnetic recording member of claim 1, wherein the degree of polymerization of said copolymer ranges from about 0.3 to about 0.8 and the molecular weight of said epoxy resin ranges from about 300 to about 3,000, said epoxy resin having less than 0.5 free hydroxy group per 100g of epoxy resin.

6. The magnetic recording member of claim 1, wherein said ferromagnetic chromium dioxide is ferromagnetic chromium dioxide or a modified ferromagnetic chromium dioxide material containing less than about 5% by weight based on the total weight of the material of an additive selected from the group consisting of ruthenium, tin, antimony, titanium, vandium, manganese, iron, cobalt, nickel, fluorine, phosphorus, arsenic, bismuth, niobium, tantalum, sodium, potassium, lithium, cesium, cadmium, tellurium, beryllium, boron, magnesium, zinc, ziroconium, platinum, gold, and mercury.

7. The magnetic recording member of claim 6, wherein said additive is present at a level of from 0.5 to 2% by weight.

8. The magnetic recording member of claim 6, wherein said ferromagnetic dioxide has a particle size ranging from about 0.3 to about 1 micron.

* * * * *